United States Patent Office 3,215,707
Patented Nov. 2, 1965

3,215,707
LUBRICANT
Rudolph J. Rense, Gates Mills, Ohio, assignor to The Lubrizol Corporation, Wickliffe, Ohio, a corporation of Ohio
No Drawing. Original application June 7, 1960, Ser. No. 34,390. Divided and this application Mar. 31, 1964, Ser. No. 356,050
9 Claims. (Cl. 260—326.3)

This application is a division of copending application Ser. No. 34,390 filed June 7, 1960.

This invention relates to hydrocarbon-substituted succinic acids and derivatives thereof. In the more particular sense it relates to an improved process for the preparation of such compounds.

Hydrocarbon-substituted succinic acid compounds are useful for a wide variety of purposes. For example, the acids and the anhydrides are useful as rust-inhibiting agents in aqueous and hydrocarbon oil compositions; the esters, as synthetic lubricating oils, plasticizers, and paint vehicles; the metal and ammonium salts, as dispersing agents. The methods heretofore known in the art for preparing such compounds usually involve the alkylation of maleic anhydride with an olefinic hydrocarbon or a halogen-substituted hydrocarbon to produce an alkenyl-substituted succinic anhydride. The anhydride so obtained may be converted to the corresponding acid, ester, amide, salt, or a like derivative by treatment with water, alcohols, phenols, amines, or basic metal compounds. It is likewise known in the art that alkenyl-substituted succinic acid compounds are obtainable directly from maleic acid, esters, or salts by treatment of the maleic compound with an olefinic or halogen-containing hydrocarbon. The alkenyl-succinic acid compounds may also be converted to the corresponding alkyl-substituted succinic acid compounds by hydrogenation.

The commercial usefulness of the processes for preparing hydrocarbon-substituted succinic compounds depends to a large measure upon the ease with which the processes can be carried out and also upon the properties characterizing the products obtained therefrom. In this respect it should be pointed out that the alkylation of maleic anhydride with an olefinic hydrocarbon is very time-consuming and furthermore limited in its applicability to relatively low molecular weight olefinic hydrocarbon reactants, i.e., those having less than about 12-15 carbon atoms. The higher molecular weight olefinic hydrocarbons are apparently not sufficiently reactive with maleic anhydride to be useful as the alkylating agent. Thus, high molecular weight hydrocarbon-substituted succinic acid compounds are almost invariably prepared by reacting maleic anhydride with a halogenated high molecular weight hydrocarbon reactant. While this latter reaction is used commercially, it has several drawbacks. A principal drawback is that it requires a first step of halogenating a hydrocarbon and a second step of reacting maleic anhydride with the halogenated hydrocarbon so obtained. Both steps are slow so that the overall process is extremely time-consuming. Another serious drawback is that the products obtained by this two-step process are usually dark in color. It will be readily appreciated that a dark colored product is much less appealing than a similar but light colored product. Consequently the usefulness of high molecular weight hydrocarbon-substituted succinic acid compounds has not been so widespread as their properties have indicated.

It is apparent, therefore, that a more efficient process or one which is capable of producing light colored hydrocarbon-substituted succinic acid compounds will greatly enhance the commercial usefulness of such products.

Accordingly it is a principal object of this invention to provide a more efficient process for preparing hydrocarbon substituted succinic acid compounds than has heretofore been known in the art.

It is also an object of this invention to provide a process for preparing light colored acylated polyamines derived from hydrocarbon-substituted succinic acid compounds.

It is another object of this invention to provide an efficient process for preparing light colored acylated polyamines derived from relatively high molecular weight hydrocarbon-substituted succinic acid compounds.

These and other objects are obtained in accordance with this invention by providing a process for preparing hydrocarbon-substituted succinic anhydrides which comprises preparing a mixture of an olefin polymer and maleic anhydride, and contacting said mixture at a temperature above about 140° C. with at least about one mole of chlorine for each mole of maleic anhydride. The product of the above process, as indicated before, is a hydrocarbon-substituted succinic anhydride, but it is not yet established whether the hydrocarbon radical is a saturated radical or one having olefinic linkages. The mechanism by which the product is formed is likewise not known. It is known, however, that the process is different from one in which the olefin polymer is first chlorinated and the chlorinated polymer is then allowed to react with maleic anhydride under similar reaction conditions. The latter two-step process requires a considerably lengthier reaction time and results in products which are much darker in color. Also, if the olefin polymer is to be chlorinated first, the chlorination temperature should not be allowed to exceed about 120° C. Higher temperatures are known to cause dechlorination and thus result in products having little or no chlorine. In this respect, it will be noted that the temperature for the process of this invention is considerably above the maximum temperature suitable for preparing chlorinated olefin polymers.

To carry out the process of this invention, it is critically important that the chlorine be introduced into the reaction zone after the olefin polymer has been thoroughly mixed with maleic anhydride. If the chlorine is allowed to come into contact with the olefin polymer prior to the introduction of maleic anhydride, chlorination of the polymer will take place and the advantageous results of this invention will not be obtained. The rate of introduction of the chlorine is not critical. Ordinarily, for maximum utilization of the chlorine used, the rate should be about the same as the rate of consumption of chlorine in this reaction.

The minimum temperature at which the reaction of the above process takes place at a reasonable rate is about 140° C.; hence, the minimum temperature at which the process should be carried out is in the neighborhood of 140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in the herein-described process requires approximately equi-molar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect As indicated previously the process of this invention is applicable to the preparation of hydrocarbon substituted succinic anhydride from olefin polymers. The olefin polymers include principally the homopolymers and interpolymers of lower mono-olefin, i.e., ethylene, propene, isobutene, and n-butene. Interpolymers of the above-illustrated lower mono-olefins with interpolymerizable higher mono-olefins or diolefins such as hexene, cyclohexene, butadiene, isoprene, chloroprene, etc., are likewise contemplated for use herein, provided that the lower mono-olefin units comprise at least 90–95% by weight of the polymer. The interpolymers may be exemplified by copolymers of 99% of isobutene with 1% of butadiene, copolymers of 95% of isobutene with 5% of styrene, copolymers of 98% of propene with 2% of piperylene, terpolymers of 97% of isobutene with 1% of piperylene and 1% of propene, etc. For the most part, polymers of isobutene are preferred for reasons of their ready availability and the particular utility of the products obtained therefrom. The molecular weights of the polymers contemplated for use herein may vary within broad limits such as from about 100 to about 50,000 or even higher. Polymers having intermediate molecular weights, i.e., 250–3000 are especially useful.

The following examples illustrate the process of this invention in greater detail. The ASTM color rating reported in the examples is a numerical index of the color of a sample as determined by visual comparison of the 15% solution by weight (in kerosene) with a series of different colored standards ranging from light lemon-colored standard (rating of 1) to deep red-colored standard (rating of 8). Examples 2, 4 and 5 illustrate the prior art processes, all of which require considerably lengthier reaction time to produce the desired products than the process of this invention illustrated in Examples 1 and 3. It will be noted also that the product of Example 2 has an ASTM color rating of 8 whereas an otherwise similar product prepared by the process of this invention (Example 1) has an ASTM color rating of 4.

Example 1

A mixture of 750 parts (by weight) of a polyisobutene having a molecular weight of 900 and 80 parts of maleic anhydride is purged with nitrogen for 30 minutes at room temperature and then heated to 178° C. To this mixture there is added beneath its surface 70 parts of chlorine during a period of 5 hours at 178°–200° C. The reaction mixture is heated at 200° C. for 30 minutes to distill off any unreacted maleic anhydride and the residue (820 parts, representing 99% of the theoretical yield) is found to have the following analyses:

Acid number _____ 100
Percent chlorine _____ 0.4
ASTM color _____ 4

Example 2

A polyisobutene of Example 1 is chlorinated to a product having a chlorine content of 4.3% prepared by passing 72 parts (by weight) of chlorine into 750 parts of the polymer at 100° C. at the maximum rate permitted by the chlorination reaction (requiring 8 hours). A mixture of 750 parts of the chlorinated polyisobutene and 85 parts of maleic anhydride is heated at 190° C. for 1 hour and then at 200°–210° C. until all of the maleic anhydride used is consumed (requiring 10 hours). The residue is found to have the following analyses:

Acid number _____ 100
Percent chlorine _____ 0.4
ASTM color _____ 8

Example 3

A mixture of 500 parts (by weight) (5.1 moles) of maleic anhydride and 1080 parts (6.4 moles) of propylene tetramer is heated to 175° C., and 385 parts (5.5 moles) of chlorine is introduced beneath the surface of the mixture at 175°–205° C. within a period of 4.5 hours. The mixture is then purged with nitrogen for 30 minutes at 180°–205° C. The residue is then heated at 230°–300° C. whereupon 1122 parts (92% of the theoretical yield) of the propylene tetramer substituted succinic anhydride is collected as the distillate. The distilled anhydride is found to have the following analyses:

Percent chlorine _____ 0.4
Acid number _____ 370

Example 4

A polyisobutene (2358 parts by weight) having a similar to that obtained in Example 3 is prepared by heating a mixture of 500 parts (5.1 moles) of maleic anhydride and 1080 parts (6.4 moles) of propylene tetramer at 150°–205° C. The reaction requires 24 hours of heating at this temperature to produce 1160 parts (85% of the theoretical yield) of a distilled product having an acid number of 350.

Example 5

Chlorine is introduced beneath the surface of 1670 parts (10 moles) of propylene tetramer at 60°–90° C. at a rate of 40 parts/hour until 300 parts of chlorine has incorporated into the mixture (requiring 20 hours). The mixture is washed with aqueous $NaHCO_3$ and water and then dried and distilled to give 285 parts of a mono-chlorine substituted propylene tetramer. A mixture of 660 parts (3.14 moles) of the mono-chlorine substituted propylene tetramer and 294 parts (3 moles) of maleic anhydride is heated to 170° C. in 5 hours and at 170°–175° C. for 5 more hours. The mixture is then heated at 130° C./18 mm. Hg and filtered. The filtrate, weighing 690 parts (74% of the theoretical yield) is found to have the following analyses:

Percent chlorine _____ 2.7
Acid number _____ 323

Example 6

A propylene tetramer substituted succinic anhydride molecular weight of 1000 is converted to a substituted succinic anhydride by reaction with maleic anhydride and chlorine at 155° C. according to the following stepwise procedure: mixing with 50 parts of maleic anhydride and followed by bubbling into the mixture 35 parts of chlorine in 1 hour; mixing with an additional 50 parts of maleic anhydride and followed by bubbling into the mixture 35 parts of chlorine in 1 hour; mixing with an additional 50 parts of maleic anhydride and followed by bubbling into the mixture 35 parts of chlorine in 1 hour; mixing with an additional 50 parts of maleic anhydride and followed by bubbling into the mixture 35 parts of chlorine in 1 hour; mixing with an additional 25 parts of maleic anhydride and followed by bubbling into the mixture 17.5 parts of chlorine in 0.5 hour; mixing with an additional 28 parts of maleic anhydride and followed by bubbling into the mixture 32.5 parts of chlorine in 1 hour; and mixing with an additional 22 parts of maleic anhydride and followed by bubbling into the mixture 27.5 parts of chlorine in 1 hour. The anhydride product obtained is found to have the following analyses:

Percent chlorine _____ 0.5
Acid number _____ 97.5
ASTM color _____ 2–3

The products obtained by the process of this invention are useful for a large variety of purposes well known in the art. For example, the relatively low molecular weight (e.g., 150–300) hydrocarbon-substituted anhydrides are known to be effective as rust-inhibiting additives in gasolines, fuel oils, cutting oils, automotive engine lubricants, etc. When used in such compositions only a very small amount usually in the neighborhood of 0.001–0.5% by weight of the additive is sufficient to produce the desired result. A specific example illustrating such use is a catalytically cracked Number 2 light fuel oil to which there is added 0.02% by weight of the product of Example 3.

The higher molecular weight hydrocarbon-substituted succinic anhydrides are useful, for example, as intermediates for the preparation of ester derivatives which are useful as synthetic lubricating oils, paint vehicles, and plasticizers. The metal salts, amides, and ammonium salts of such anhydrides are useful as dispersing agents in hydrocarbon oil compositions. When used as dispersing agents, the salts or amides are generally employed in amounts from 0.5–5%, more often in the neighborhood of 1–3%, by weight of the hydrocarbon oil composition.

A particularly useful class of additives for hydrocarbon oils comprise acylated polyamines prepared by reacting the hydrocarbon-substituted succinic anhydride of this invention with an ethylene amine under dehydrating conditions.

The term "ethylene amine" is used in a generic sense to denote a class of polyamines conforming for the most part to the structure

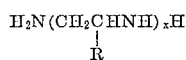

in which $x$ is an integer and R is a low molecular weight alkyl radical or hydrogen. Thus it includes for example, ethylene diamine, diethylene triamine, triethylene tetramine, tetraethylene pentamine, pentaethylene hexamine, etc. These compounds are discussed in some detail under the heading "Ethylene Amines" in "Encyclopedia of Chemical Technology," Kirk and Othmer, Vol. 5, pages 898–905, Interscience Publishers, New York (1950). Such compounds are prepared most conveniently by the reaction of ethylene dichloride with ammonia. This process results in the production of somewhat complex mixtures of ethylene amines, including cyclic condensation products such as piperazines and these mixtures find use in the process of this invention. On the other hand, quite satisfactory products may be obtained also by the use of pure ethylene amines. An especially useful ethylene amine, for reasons of economy as well as effectiveness as a dispersant, is a mixture of ethylene amines prepared by the reaction of ethylene chloride and ammonia, having a composition which corresponds to that of tetraethylene pentamine. This is available in the trade under the trade name "Polyamine H."

It has been noted that at least one-half of a chemical equivalent amount of the ethylene amine per equivalent of substituted succinic anhydride must be used in the process to produce a satisfactory product with respect to dispersant properties and generally it is preferred to use these reactants in equivalent amounts. Amounts up to 2.0 chemical equivalents (per equivalent of substituted succinic anhydride) have been used with success, although there appears to be no advantage attendant upon the use of more than this amount. The chemical "equivalency" of the ethylene amine reactant is based upon the nitrogen content, i.e., one having four nitrogens per molecule has four equivalents per mole.

The reaction of the process involves a splitting out of water and the reaction conditions are such that this water is removed as it is formed. Presumably the first principal reaction that occurs, following salt formation, is the formation of a half amide

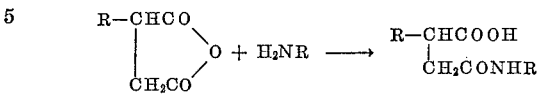

followed then by salt formation

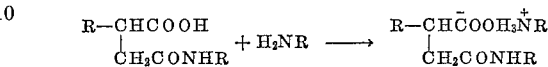

and involving finally dehydration of this salt to form the product

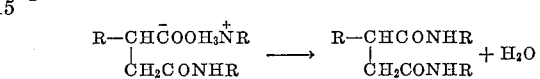

The first two of these reactions appear to take place spontaneously (when a substituted succinic anhydride is used) upon mixing, but the third requires heating. Temperatures within the range of about 80° C. to about 200° C. are satisfactory, and within this range it is preferred to use a reaction temperature of from about 100° C. to about 160° C. A useful method of carrying out this step is to add some toluene to the reaction mixture and to remove the water by azeotropic distillation. As indicated before there is also some imide-formation.

The following example illustrates the process which may be used to prepare the acylated polyamines.

*Example 7*

To a mixture of 241 parts (by weight) of the substituted succinic anhydride of Example 6 and 63 parts of mineral oil, there are added 4.25 parts of diethylene triamine and 12.75 parts of triethylenetetramine at 65°–85° C. in 2 hours. The mixture is heated to 150° C. in 5 hours, blown with nitrogen for 5 hours at 150°–155° C., and filtered. The filtrate is found to have the following analyses:

Percent nitrogen _____ 2.04
Neutralization No._____ [1] 31
ASTM color_____ 2–3

[1] Basic.

Further illustration of the usefulness of the acylated polyamines of this invention as dispersants in motor oils was gained from a modified version* of the CRC–EX–3 Engine Test. This test is recognized in the field as an important test by which lubricants can be evaluated for use under light-duty service conditions. In this particular test the lubricant is used in the crankcase of a 1954 6-cylinder Chevrolet Powerglide engine for 144 hours under recurring cycling conditions, each cycle consisting of:

2 hours at an engine speed of 500±25 r.p.m. under zero load at an oil sump temperature of 100°–125° F.; air-fuel ratio of 10:1;
2 hours at an engine speed of 2500±25 r.p.m. under a load of 40 brake-horsepower at an oil sump temperature of 160°–170° F.; air-fuel ratio of 16:1;
2 hours at an engine speed of 2500±25 r.p.m. under a load of 40 brake-horsepower at an oil sump temperature of 240°–250° F.; air-fuel ratio of 16:1.

After completion of the test, the engine is dismantled and various parts of the engine are examined for engine deposits. The lubricant dispersant addition agent is then rated according to (1) the extent of piston ring-filling, (2) the amount of sludge formed in the engine (on a scale of 80–0, 80 being indicative of no sludge and 0 being indicative of extremely heavy sludge), and (3) the total amount of engine deposits, i.e., sludge and varnish,

*Ordinarily this test lasts for 96 hours.

formed in the engine (on a scale of 100-0, 100 being indicative of no deposits and 0 being indicative of extremely heavy deposits).

A SAE-20 lubricating oil to which there have been added 0.5% (by weight of the product of Example 7, 0.076% of phosphorus as a zinc dialkylphosphorodithioate, 0.003% of a polyalkylsiloxane anti-foam agent, and 0.3% of sulfate ash as a basic barium salt of an organic phosphorus acid prepared by the reaction of a polyisobutene having a molecular weight of 1000 with phosphorus trichloride and an alkyl phenol is found by this engine test to give the following result: Piston Ring Filling—2%; Sludge Rating—74.7; Total Deposit Rating—92.4.

What is claimed is:

1. A process for preparing acylated polyamines comprising preparing a mixture of an aliphatic polymer of a lower mono-olefin and maleic anhydride; contacting said mixture at a temperature above about 140° C. and below the decomposition point of said mixture with about one mole of chlorine for each mole of maleic anhydride to form a substituted succinic anhydride; mixing said substituted succinic anhydride with at least about one-half an equivalent of an ethylene polyamine having the structure

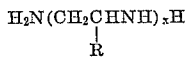

wherein R is selected from the class consisting of hydrogen and lower alkyl and $x$ has an average value ranging from 1 to about 6; and heating said mixture at a temperature above about 80° C. and below the decomposition point of said mixture to effect acylation and remove the water formed thereby.

2. The process of claim 1 wherein the ethylene polyamine is a polyethylene polyamine having about five amino groups.

3. The process of claim 1 wherein the aliphatic polymer is a polymer of isobutene.

4. The process of claim 1 wherein the aliphatic polymer is an interpolymer of at least about 90% by weight isobutene and up to about 10% by weight a di-olefin.

5. The process of claim 1 wherein the aliphatic polymer is a polyisobutene having a molecular weight within the range of from about 500 to about 3,000.

6. A process for preparing acylated polyamines comprising preparing a mixture of a polyisobutene having a molecular weight of from about 500 to about 3,000 and maleic anhydride, contacting said mixture at a temperature of from about 140° C. to about 250° C. with about one mole of chlorine for each mole of maleic anhydride to form a substituted succinic anhydride, mixing said substituted succinic anhydride with from about one-half to about two equivalents of a polyethylene polyamine having up to about six amino groups, and heating said mixture at a temperature above about 80° C. and below the decomposition point to effect acylation and remove the water formed thereby.

7. A process for preparing acylated polyamines comprising preparing a mixture of a polyisobutene having a molecular weight of about 1,000 and about one mole of maleic anhydride, contacting said mixture at a temperature from about 160° C. to about 220° C. with about one mole of chlorine to form a substituted succinic anhydride, mixing said substituted succinic anhydride with from about one-half to about two equivalents of tetraethylene pentamine, and heating said mixture at a temperature of from about 100° C. to about 200° C. to effect acylation and remove the water formed thereby.

8. A process for preparing acylated polyamines comprising preparing a mixture of a polyisobutene having a molecular weight of about 1,000 and about one mole of maleic anhydride, contacting said mixture at a temperature from about 160° C. to about 220° C. with about one mole of chlorine to form a substituted succinic anhydride, mixing said substituted succinic anhydride with from about one-half to about two equivalents of ethylene diamine, and heating said mixture at a temperature of from about 100° C. to about 200° C. to effect acylation and remove the water formed thereby.

9. A process for preparing acylated polyamines comprising preparing a mixture of a polyisobutene having a molecular weight of about 1,000 and about one mole of maleic anhydride, contacting said mixture at a temperature from about 160° C. to about 220° C. with about one mole of chlorine to form a substituted succinic anhydride, mixing said substituted succinic anhydride with from about one-half to about two equivalents of a mixture of diethylene triamine and triethylene tetramine, and heating said mixture at a temperature of from about 100° C. to about 200 C. to effect acylation and remove the water formed thereby.

References Cited by the Examiner

UNITED STATES PATENTS

| 2,490,744 | 12/49 | Trigg et al. | 252—51.5 X |
|---|---|---|---|
| 2,604,451 | 7/52 | Rocchini | 252—51.5 |
| 3,018,250 | 1/62 | Anderson et al. | 252—51.5 |

FOREIGN PATENTS

| 1,254,094 | 1/61 | France. |
|---|---|---|
| 1,265,086 | 5/61 | France. |
| 922,831 | 4/63 | Great Britain. |

DANIEL E. WYMAN, *Primary Examiner.*